(12) United States Patent
Choi et al.

(10) Patent No.: US 9,596,663 B2
(45) Date of Patent: Mar. 14, 2017

(54) METHOD AND APPARATUS FOR TRANSMITTING AND RECEIVING TRAINING SEQUENCE CODE IN COMMUNICATION SYSTEM

(75) Inventors: Jong Soo Choi, Suwon-si (KR); Byoung Jo Choi, Incheon (KR); Seung Hoon Hwang, Seoul (KR); Young Bum Kim, Seoul (KR); Ho Yong Lim, Seoul (KR)

(73) Assignees: Samsung Electronics Co., Ltd (KR); Dongguk University Industry Academic Cooperation Foundation (KR)

( * ) Notice: Subject to any disclaimer, the term of this patent is extended or adjusted under 35 U.S.C. 154(b) by 479 days.

(21) Appl. No.: 13/575,863

(22) PCT Filed: Jan. 27, 2011

(86) PCT No.: PCT/KR2011/000571
§ 371 (c)(1),
(2), (4) Date: Jul. 27, 2012

(87) PCT Pub. No.: WO2011/093655
PCT Pub. Date: Aug. 4, 2011

(65) Prior Publication Data
US 2012/0314687 A1 Dec. 13, 2012

(30) Foreign Application Priority Data

Jan. 29, 2010 (KR) .................. 10-2010-0008473

(51) Int. Cl.
*H04W 4/00* (2009.01)
*H04B 7/00* (2006.01)
(Continued)

(52) U.S. Cl.
CPC ......... *H04W 52/42* (2013.01); *H04L 25/0204* (2013.01); *H04L 27/0008* (2013.01);
(Continued)

(58) Field of Classification Search
CPC .... H04W 24/00; H04W 40/06; H04W 52/325
(Continued)

(56) References Cited

U.S. PATENT DOCUMENTS 6,337,855 B1 * 1/2002 Malkamaki .................. 370/347
2005/0157684 A1 * 7/2005 Ylitalo et al. ................ 370/334
(Continued)

FOREIGN PATENT DOCUMENTS

EP 2129142 12/2009
WO WO 2004075434 9/2004

OTHER PUBLICATIONS

PCT/ISA/237 Written Opinion issued on PCT/KR2011/000571 (pp. 4).
PCT/ISA/210 Search Report issued on PCT/KR2011/000571 (pp. 3).

*Primary Examiner* — Man Phan
*Assistant Examiner* — Ryan Kavleski
(74) *Attorney, Agent, or Firm* — The Farrell Law Firm, P.C.

(57) ABSTRACT

A method and apparatus for transmitting a training sequence code of a transmitting apparatus with a plurality of transmitting antennas in a communication system are provided. A transmitting apparatus allocates a plurality of time slots for the plurality of transmitting antennas to be divided into at least one frame, and sends a training sequence code with reference power for any one of the transmitting antennas, and sends remaining training sequence codes for remainders of the transmitting antennas with transmission power from zero to the reference power, in any one of the time slots. A (Continued)

receiving apparatus receives a plurality of training sequence codes for a plurality of transmitting antennas through any one of the plurality of receiving antennas from a transmitting apparatus, and selects one of the training sequence codes having the greatest reception power to estimate a channel. This may improve a channel estimation performance in a communication system.

13 Claims, 12 Drawing Sheets

(51) Int. Cl.
*H04W 52/42* (2009.01)
*H04L 25/02* (2006.01)
*H04L 27/00* (2006.01)
*H04L 27/18* (2006.01)
*H04W 52/32* (2009.01)
*H04B 7/26* (2006.01)

(52) U.S. Cl.
CPC ........ *H04L 27/0012* (2013.01); *H04L 27/183* (2013.01); *H04W 52/325* (2013.01); *H04B 7/2656* (2013.01)

(58) Field of Classification Search
USPC .................... 370/334; 455/67.14, 522, 562.1
See application file for complete search history.

(56) References Cited

U.S. PATENT DOCUMENTS

| | | | |
|---|---|---|---|
| 2005/0169397 A1* | 8/2005 | Goel et al. | 375/267 |
| 2005/0169398 A1* | 8/2005 | Magee et al. | 375/267 |
| 2006/0009168 A1 | 1/2006 | Khan et al. | |
| 2006/0104380 A1* | 5/2006 | Magee et al. | 375/267 |
| 2006/0262879 A1* | 11/2006 | Smith | H03G 3/3047 375/297 |
| 2007/0097946 A1* | 5/2007 | Mujtaba | H04B 7/0671 370/349 |
| 2007/0111684 A1* | 5/2007 | Kaczynski | 455/127.2 |
| 2009/0196372 A1* | 8/2009 | Zhang | H04B 7/0417 375/267 |
| 2010/0322337 A1* | 12/2010 | Ylitalo et al. | 375/267 |
| 2012/0122392 A1* | 5/2012 | Morioka et al. | 455/25 |

* cited by examiner

Fig. 3
(a)
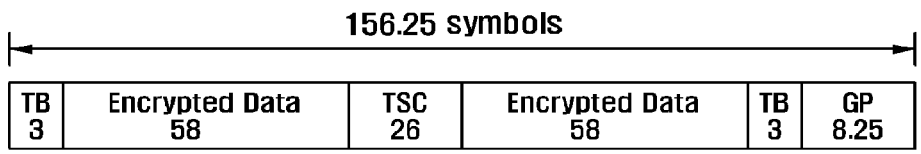
(b)
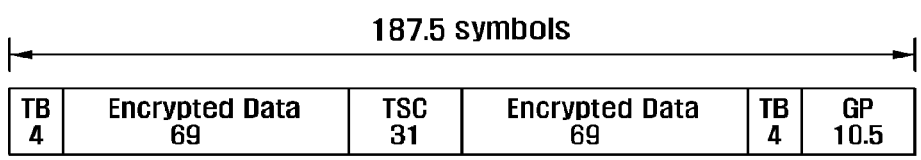
Fig. 4
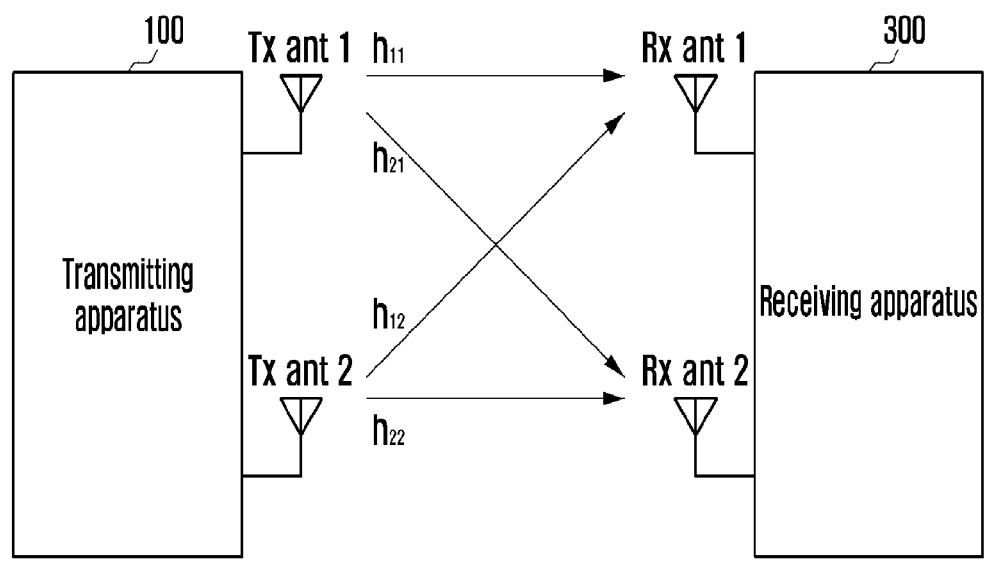

Fig. 9
(a)
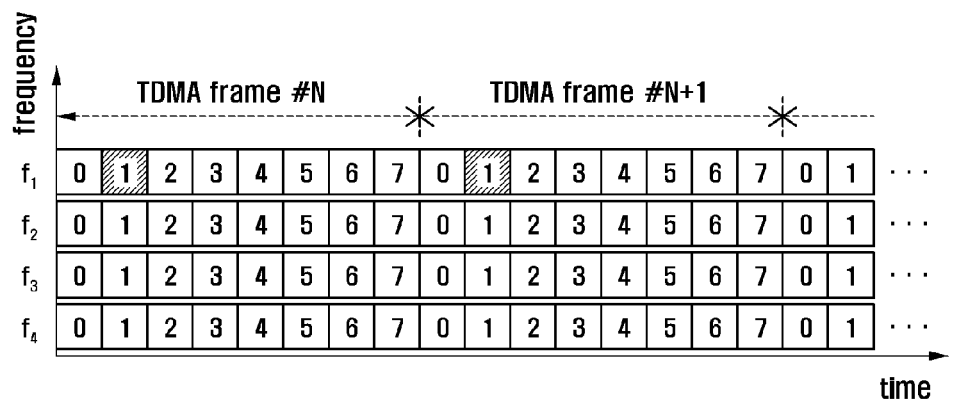
(b)
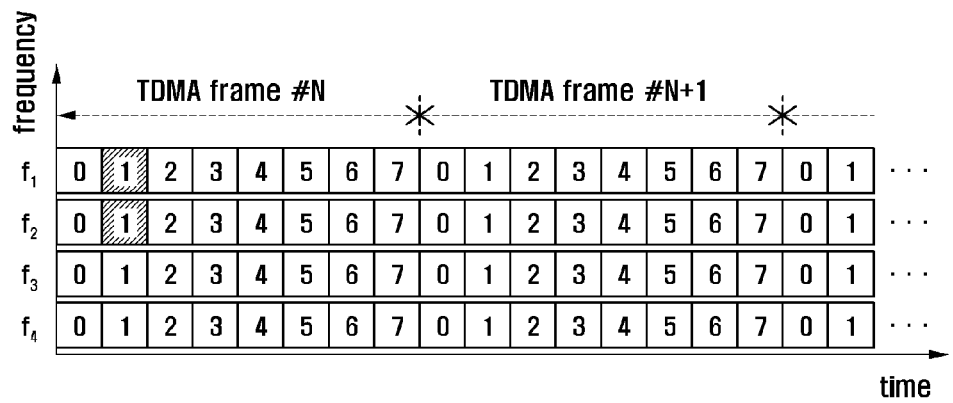

Fig. 11
(a)
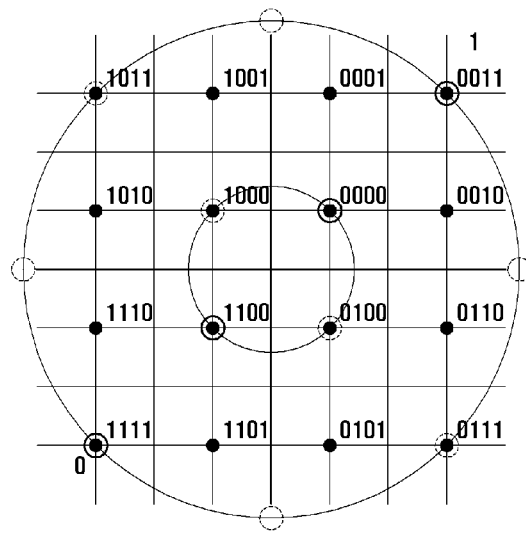
(b)
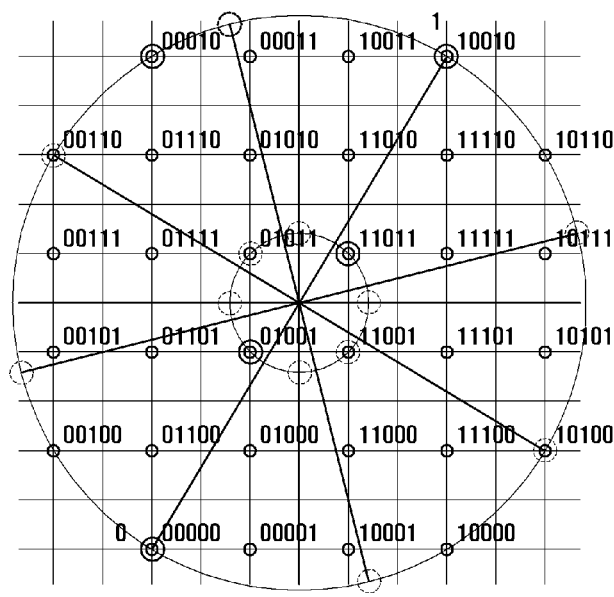

METHOD AND APPARATUS FOR TRANSMITTING AND RECEIVING TRAINING SEQUENCE CODE IN COMMUNICATION SYSTEM

TECHNICAL FIELD

The present invention relates to a method and an apparatus for transmitting and receiving a signal in a communication system, and more particularly, to a method for transmitting and receiving training sequence codes in a communication system, and a method thereof.

BACKGROUND ART

In general, a communication system such as Global System for Mobile Communications (GSM) and Enhanced Data Rates for GSM Evolution (EDGE) being an enhance type of the GSM combines and uses a Frequency Division Multiple Access (FDMA) scheme for multiple access and a Time Division Multiple Access (TDMA). The communication system divides a frequency band to form a plurality of channels, and constructs and uses respective channels with a TDMA frame. Furthermore, the communication system divides the TDMA frame into a plurality of time slots and provides a communication service to plural users through the time slots.

Moreover, the communication system constructs and uses respective time slots in a burst structure. Namely, a transmitter of the communication system sends data and a Training Sequence Code (TSC) according to a burst structure. In addition, a receiver of the communication system receives and processes data and the TSC according to the burst structure. Here, the receiver estimates a channel using the TSC. In this case, when a Single Input Single Output (SISO) is applied to the transmitter and the receiver, the transmitter and the receiver sends and receives a single TSC using a single Transmitting antenna (Tx ant) and a single Receiving antenna (Rx ant), respectively. In the meantime, when a Multiple Input Multiple Output (MIMO) is applied to the transmitter and the receiver, the transmitter and the receiver sends and receives a plurality of TSCs using a plurality of transmitting antennas and a plurality of receiving antennas, respectively.

DISCLOSURE OF INVENTION

Technical Problem

However, interference may occur between training sequence codes in the foregoing communication system. That is, when the transmitter sends a training sequence code for respective transmitting antennas through the transmitting antennas, the receiver receives the training sequence codes by receiving antennas. Due to this, the training sequence codes act by mutual interference to deteriorate the channel estimation performance. Accordingly, there is a need for a method for improving a channel estimation performance in the communication system.

Solution to Problem

The present invention has been made in view of the above problems, and provides an apparatus and a method for transmitting and receiving training sequence codes in a communication system.

In accordance with an aspect of the present invention, a method for transmitting a training sequence code of a transmitting apparatus with a plurality of transmitting antennas in a communication system, includes: allocating a plurality of time slots for the plurality of transmitting antennas to be divided into at least one frame; and transmitting a training sequence code with reference power for any one of the transmitting antennas, and transmitting remaining training sequence codes for remainders of the transmitting antennas with transmission power from zero to the reference power, in any one of the time slots.

In accordance with another aspect of the present invention, a method for receiving a training sequence code of a receiving apparatus with a plurality of receiving antennas in a communication system, includes: receiving a plurality of training sequence codes for a plurality of transmitting antennas through any one of the plurality of receiving antennas from a transmitting apparatus; and selecting one of the training sequence codes having the greatest reception power to estimate a channel, wherein the transmitting apparatus sends one of the training sequence codes through one of the transmitting antennas with reference power, and sends remainders of the training sequence codes through remainders of the transmitting antennas with transmission power from zero to the reference power, in any one of a plurality of time slots allocated to be divided into at least one frame.

In accordance with another aspect of the present invention, a transmitting apparatus with a plurality of transmitting antennas in a communication system, includes: a controller allocating a plurality of time slots for a plurality of transmitting antennas to be divided into at least one frame; and a plurality of transmitting units configured corresponding to the respective transmitting antennas, and each of the transmitting units including a generator generating a training sequence code, and a transmission processor processing and transmitting the training sequence code through the transmitting antenna, wherein the transmitting unit sends a training sequence code with reference power for one of the transmitting antennas, and sends remaining training sequence codes for remainders of the transmitting antennas with transmission power from zero to the reference power, in one of the time slots.

In accordance with another aspect of the present invention, a receiving apparatus with a plurality of receiving antennas in a communication system, includes: receiving units configured corresponding to a plurality of receiving antennas and receiving a plurality of training sequence codes for a plurality of transmitting antennas from a transmitting apparatus; and a controller selecting and estimating one of the training sequence codes with the greatest reception power upon reception of the training sequence codes through one of the receiving antennas, wherein the transmitting apparatus sends any one of the training sequence codes through one of the transmitting antennas with reference power, and sends remainders of the training sequence codes through remainders of the transmitting antennas with transmission power from zero to the reference power, in one of a plurality of time slots allocated to be divided into at least one frame.

ADVANTAGEOUS EFFECTS OF INVENTION

Accordingly, in the apparatus and the method for transmitting and receiving a training sequence code in a communication system according to the present invention, a transmitting apparatus sends training sequence codes with different transmission intensities by transmitting antennas through a specific time slot such that a receiving apparatus may suppress mutual interference between training sequence codes. This may improve the channel estimation performance in the communication system.

BRIEF DESCRIPTION OF DRAWINGS

The objects, features and advantages of the present invention will be more apparent from the following detailed description in conjunction with the accompanying drawings, in which:

FIG. 3 is a view illustrating an example of a general burst structure;

FIG. 4 is a block diagram illustrating a configuration of a communication system according to an exemplary embodiment of the present invention;

FIG. 9 to FIG. 11 are views illustrating a method for transmitting a training sequence code according to an exemplary embodiment of the present invention.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
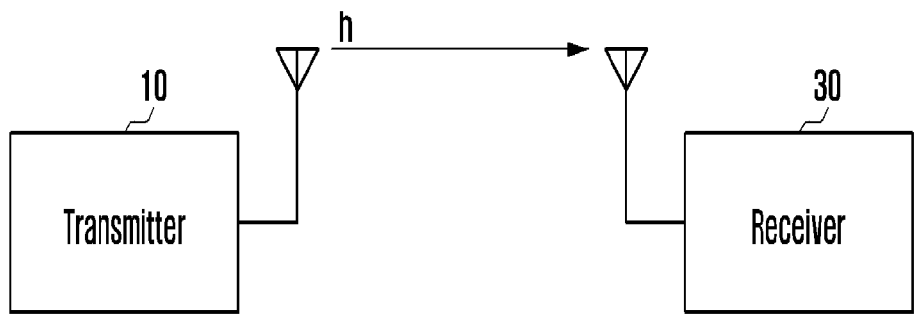
FIG. 1 is a block diagram illustrating a configuration of an existing communication system.
Figure 2:
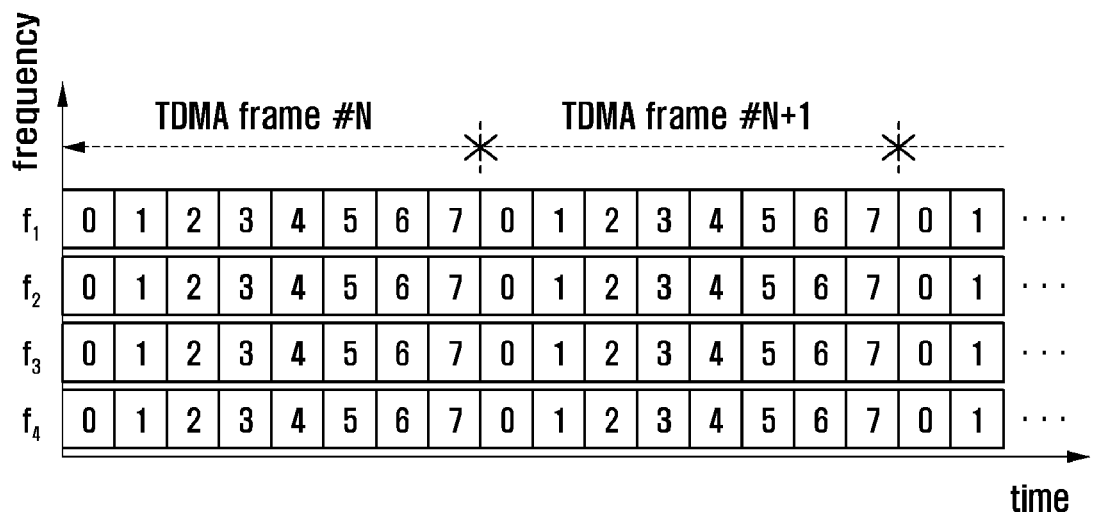
FIG. 2 is a view illustrating an example of a general TDMA frame structure.

FIG. 1 is a block diagram illustrating a configuration of a communication system according to the related art. FIG. 2 is a view illustrating an example of a general TDMA frame structure. FIG. 3 is a view illustrating an example of a general burst structure.

Referring to FIG. 1, the existing communication system includes a transmitter 10 and a receiver 30. In this case, the transmitter 10 and the receiver 30 may be implemented in an SISO structure in the communication system. That is, the transmitter 10 includes a single transmitting antenna, and the receiver 30 includes a single receiving antenna.

As shown in FIG. 2, the communication system provides a communication service with a TDMA frame structure continued according to a time. Here, a TDMA frame may be composed of plural, for example, eight time slots. Further, the TDMA frame may be divided into plural, for example, four frequency bands. In this case, the transmitter 10 may send a signal to plural corresponding receivers 30 by time slots and send a signal to a specific receiver 30 through plural TDMA frames. For example, in a TDMA frame (TDMA frame #N) having a frame index of N, the transmitting apparatus 10 may send a signal to the receiving apparatus 30 through a frequency band f1 corresponding to a frequency index of a time slot TS1 of 1 corresponding to a slot index of 1. Furthermore, in a TMDA frame (TDMA frame #N+1) corresponding to a frame index of N+1, the transmitting apparatus 10 may send the signal to the receiving apparatus 30 through a frequency band f3 corresponding to a frequency band of a time slot TS1 of 3 corresponding to a slot index of 1 through frequency hopping.

Furthermore, in respective time slots, the transmitter 10 sends a signal according to a burst structure as shown in FIG. 3. In this case, the burst structure is determined by plural symbols, and is divided into areas for a Tail Bit (TB), encrypted data, a training sequence code, a Guard Period (GP). Namely, in the burst structure, an area for the training sequence code is arranged at a center of an area for data, an area for the TB is arranged at both ends of the area for data, and an area for protection section is arranged at an end to be connected to the area for the TB. Here, according to symbol rates by areas for the TB, the data, the training sequence code, and protection section, a burst structure may be divided into a normal burst (NB) structure as shown in FIG. 3(a) or a High symbol rate Burst (HB) as shown in FIG. 3(b). For example, in the NB structure, the area for the training sequence code may be composed of 26 symbols. In the HB structure, the area for the training sequence code may be composed of 31 symbols.

Meanwhile, the receiver 30 receives a signal according to a burst structure through a time slot allocated from the transmitter 10. Further, the receiver 30 estimates a channel using a training sequence code received from the transmitter 10. In this case, the receiver 30 may determine the training sequence code received from the transmitter 10 as expressed in a following Math Figure 1, and estimate Channel State Information (CSI) as expressed in a following Math Figure 2 according to Least Square (LS) using the determined training sequence code.

MathFigure 1

$$r = Ah + n + q \qquad [\text{Math.1}]$$

where, r represents a vector of a received signal for a training sequence code received by the receiver 30, A represents a Toeplitz type convolution matrix composed of training sequence code symbols to which symbol rotation is applied, h represents a vector of channel state information, n represents a vector of an Additive White Gaussian Noise (AWGN) signal, and q represents a vector of a co-channel interference signal.

MathFigure 2

$$\hat{h} = (A^H A)^{-1} A^H r \qquad [\text{Math.2}]$$

FIG. 4 is a block diagram illustrating a configuration of a communication system according to an exemplary embodiment of the present invention.

Referring to FIG. 4, the communication system of the present invention includes a transmitting apparatus 100 and a receiving apparatus 300. In this case, the transmitting apparatus 100 and the receiving apparatus 300 of the present invention are implemented in an MIMO structure. That is, the transmitting apparatus 100 includes a plurality of transmitting antennas, and the receiving apparatus 300 includes a plurality of receiving antennas.

As shown in FIG. 2, the communication system provides a communication service through a TDMA frame structure continued according to a time. In this case, the transmitting apparatus 100 sends a signal to a specific receiving apparatus 300 using a plurality of transmitting antennas in a specific time slot. Namely, as shown in FIG. 3, the transmitting apparatus 100 sends a signal for each transmitting antenna in each burst structure. Here, the transmitting apparatus 100 inserts training sequence codes for respective transmitting antennas in respective burst structures and sends the burst structures through respective transmitting antennas.

In the meantime, the receiving apparatus 300 receives a signal according to a burst structure through a time slot allocated from the transmitting apparatus 100. In this case, the receiving apparatus 300 receives signals through a plurality of receiving antennas. Further, the receiving apparatus 300 estimates channels for respective receiving antennas using training sequence codes. At this time, the receiving apparatus 300 may estimate channel state information according to the LS using received signals for the training sequence codes received from the transmitting apparatus according to an embodiment of the present invention. For example, when the transmitting apparatus 100 includes two transmitting antennas and the receiving apparatus 300 includes two receiving antennas, the receiving apparatus 300 may determine training sequence codes for respective transmitting antennas using a transmitting/receiving model as illustrated in a following Math Figure 3. Moreover, the receiving apparatus 300 may separately perform channel estimation according to respective receiving antennas. For example, in a case of one of two receiving antennas, namely, a first receiving antenna, the receiving apparatus 300 may change the following Math Figure 3 to a following Math Figure 4 to apply a channel estimation method.

MathFigure 3

$$r_1 = A_1 h_{11} + A_2 h_{12} + n_1 + q_1,$$

$$r_2 = A_1 h_{21} + A_2 h_{22} + n_2 + q_2 \qquad [\text{Math.3}]$$

where, $r_n$ denotes a training sequence code symbol vector received through an n-th receiving antenna, $A_m$ denotes a Toeplitz type convolution matrix composed of training sequence code symbols sent through an m-th transmitting antenna, $h_{nm}$ denotes a channel vector from an m-th transmitting antenna to an n-th receiving antenna, and $n_n$ and $q_n$ denote noise and a co-channel interference signal vector provided to the n-th receiving antenna, respectively.

MathFigure 4

$$r_1 = A h_1 + n_1 + q_1 \qquad [\text{Math.4}]$$

where, it is defined that $A = [A_1 \ A_2]$ and $$h_1 = [h_{11}^T h_{12}^T]^T.$$

That is, since the Math Figure 4 has the same form as that of the Math Figure 1, the receiving apparatus 300 may estimate a channel according to the LS as illustrated in the Math Figure 2. In other words, the receiving apparatus 300 uses a Joint Least Square (JLS) to simultaneously estimate channels $h_{11}$ and $h_{12}$ from two transmitting antennas to a first receiving antenna. However, the transmitting apparatus 100 may control a baseband gain to 0 or approximate value of 0 during a training sequence interval reducing power through control of the baseband gain to adjust interference according to a training sequence code of another transmitting antenna.

Figure 5:
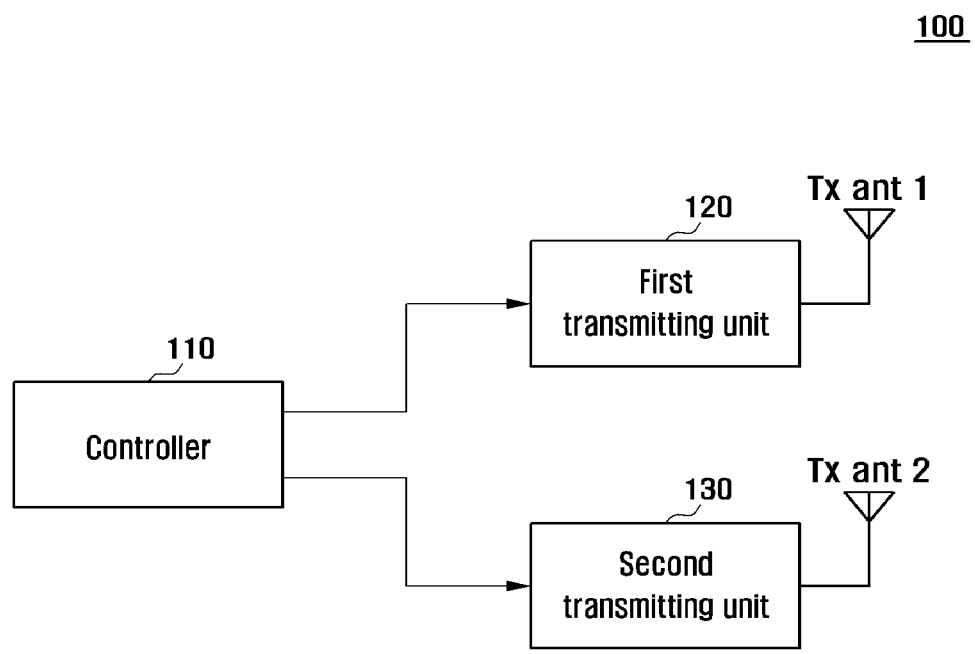
FIG. 5 is a block diagram illustrating a configuration of a transmitting apparatus according to an exemplary embodiment of the present invention.

In this case, an interference signal due to a training sequence code corresponding to low power may be included in a co-channel interference signal vector $q_n$, and the Math Figure 3 may be expressed by a following Math Figure 5. Accordingly, in place of the JLS, the receiving apparatus 300 may estimate a channel according to an LS expressed by the Math Figure 2.

MathFigure 5

$$r_1 = A_1 h_{11} + n_1 + q_1,$$

$$r_2 = A_2 h_{22} + n_2 + q_2 \qquad [\text{Math.5}]$$

where, $r_n$ is a training sequence code symbol vector received by an n-th receiving antenna in a time slot of an n-th TDMA frame.

Hereinafter, a detailed construction and operation of the transmitting apparatus 100 and the receiving apparatus 300 in the communication system as described above will be explained in detail. In this case, it is assumed that the transmitting apparatus 100 includes two transmitting antennas and the receiving apparatus 300 includes two receiving antennas. However, the present invention is not limited thereto. That is, when the transmitting apparatus 100 include at least two transmitting antennas and the receiving apparatus 300 includes at least two receiving antennas, the present invention may be implemented.

FIG. 5 is a block diagram illustrating a configuration of a transmitting apparatus according to an exemplary embodiment of the present invention.

Referring to FIG. 5, the transmitting apparatus 100 of this embodiment includes a plurality of transmitting antennas, namely, a first transmitting antenna Tx ant 1 and a second transmitting antenna Tx ant 2, a controller 110, and a plurality of transmitting units 120 and 130, namely, a first transmitting unit 120 and a second transmitting unit 130. In this case, according to addition of various functions, the transmitting apparatus 100 may include a plurality of additional structural elements but a detailed explanation thereof is omitted.

The controller 110 performs a function controlling an overall operation of the transmitting apparatus 100. In this case, the controller 110 allocates time slots for a first transmitting antenna and a second transmitting antenna to be divided into at least one TDMA frame corresponding to a specific receiving apparatus 300 according to an embodiment of the present invention. The controller 110 may distribute and allocate respective time slots to be divided into one frequency band in a plurality of TDMA frames. Further, the controller 110 may divide and allocate respective time slots to plural frequency bands in one time band of one TDMA frame. Moreover, the controller 110 may separately correspond respective time slots to the first transmitting antenna and the second transmitting antenna. The controller 110 may divides respective time slots into a first time area for the first transmitting antenna and a second time area for the second transmitting antenna such that the time slots correspond to the first transmitting antenna or the second transmitting antenna.

The first transmitting unit 120 and the second transmitting unit 130 perform a signal transmission function of the transmitting apparatus 100. The first transmitting unit 120 and the second transmitting unit 130 send a signal according to respective burst structures in time slots allocated corresponding to a specific receiving apparatus 300 of at least one TDMA frame under the control of the controller 110. In this case, the first transmitting unit 120 and the second transmitting unit 130 adjust a transmission intensity of a signal in time slots and sends the signal according to an embodiment of the present invention. That is, in a specific time slot, the first transmitting unit 120 may send a signal with set reference power, and the second transmitting unit 130 may send a signal with transmission power from zero to reference power. Here, the first transmitting unit 120 may send a signal but the second transmitting unit 130 may not send the signal. Moreover, the first transmitting unit 120 may send a signal with reference power, and the second transmitting unit 130 may send the signal with transmission power, in a first time area of a specific time slot. In addition, the first transmitting unit 120 may send a signal with the transmission power, and the second transmitting unit 130 may send the signal with the reference power, in a second time area of the specific time slot. Meanwhile, the first transmitting unit 120 and the second transmitting unit 130 have the same construction.

Figure 6:
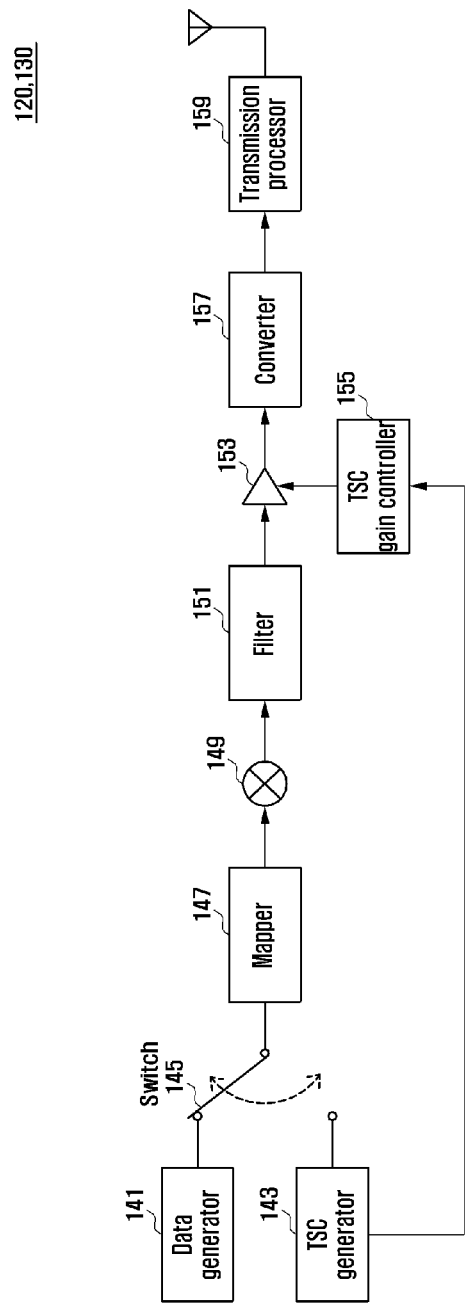
FIG. 6 is a block diagram illustrating a configuration of a transmitting unit shown in FIG. 5.

FIG. 6 is a block diagram illustrating a configuration of a transmitting unit shown in FIG. 5. In this case, it is assumed that a transmitting unit is configured corresponding one of a plurality of transmitting antennas in the transmitting apparatus, and has the same internal construction corresponding to respective antennas.

Referring to FIG. 6, each of the first and second transmitting units 120 and 130 includes a data generator 141, a TSC generator 143, a switch 145, a mapper 147, a multiplier 149, a filter 151, an amplifier 153, a converter 157, and a transmission processor 159. In this case, each of the first and second transmitting units 120 and 130 may further include a TSC gain controller 155 according to an embodiment of the present invention.

The data generator 141 generates data and a tail bit for providing to a specific receiving apparatus 300 through a transmitting antenna corresponding to the transmitting units 120 and 130. The TSC generator 143 generates a training sequence code to be provided to a specific receiving apparatus 300 through a transmitting antenna corresponding to the transmitting units 120 and 130. The TSC generator 143 determines to transmit transmission intensity of a training sequence code, namely, a training sequence code with reference power or transmission power according to an embodiment of the present invention with reference power or transmission power.

The switch 145 selectively connects to the data generator 141 or the TSC generator 143, and transfers one of a tail bit, data, or a training sequence code to the mapper 147. The mapper 147 controls the switch 145 to map the tail bit, the data, and the training sequence code to symbols according to a burst structure. In this case, the mapper 147 maps the training sequence code to symbols in a corresponding area of a burst structure. The mapper 147 may determine a location corresponding to transmission intensity of a training sequence code in a bit arrangement structure according to signal constellation in accordance with an embodiment of the present invention.

The multiplier 149 rotates a phase of a signal. The filter 151 shapes a signal. The amplifier 153 amplifies the shaped signal. In this case, the amplifier 153 amplifies the training sequence code corresponding to reference power. The TSC gain controller 155 may control the amplifier 153 to selectively reduce the reference power to the transmission power according to an embodiment of the present invention. Namely, when it is determined to transmit the training sequence code with transmission power in the TSC generator 143, the TSC gain controller 155 may control the amplifier 153. The converter 157 converts an analog signal into a digital signal. The transmission processor 159 sends the digital signal in a wireless scheme.

Figure 7:
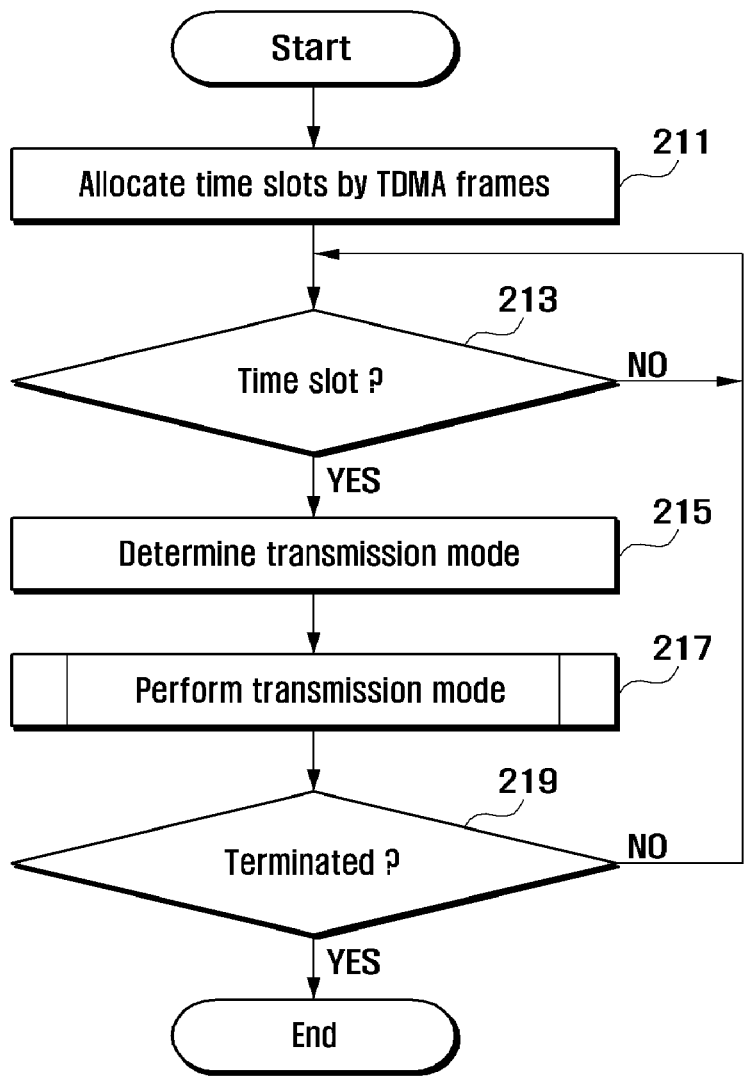
FIG. 7 is a flowchart illustrating a transmitting method according to an exemplary embodiment of the present invention.
Figure 10:
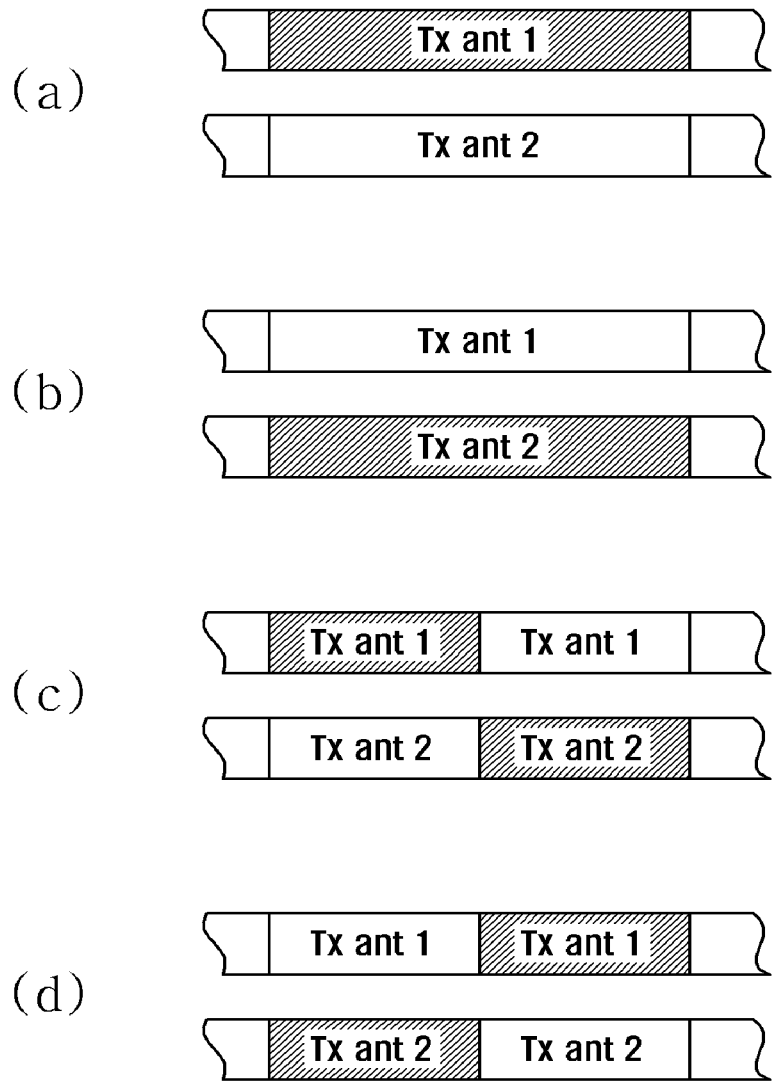

FIG. 7 is a flowchart illustrating a transmitting method according to an exemplary embodiment of the present invention. FIG. 9 to FIG. 11 are views illustrating a method for transmitting a training sequence code according to an exemplary embodiment of the present invention.

Referring to FIG. 7, in the transmitting method of this embodiment, a controller 110 allocates time slots by TDMA frames (211). That is, the controller 110 allocates time slots by receiving apparatuses 300 in respective TDMA frames. Further, the controller 110 allocates time slots for a specific receiving apparatus 300 to be divided into at least one TDMA frame. In this case, as shown in FIG. 9(*a*), the controller 110 may allocate respective time slots to be divided into one frequency band in plural TDMA frames. Moreover, as shown in FIG. 9(*b*), the controller 110 may allocate respective time slots to be divided into plural frequency bands in one time band of one TDMA frame. Furthermore, as shown in FIG. 10(*a*) and FIG. 10(*b*), the controller 110 may separately correspond respective time slots to a first transmitting antenna or a second transmitting antenna. In addition, as shown in FIGS. 10(*c*) and 10(*d*), the controller 110 may allocates respective time slots to be divided into a first time area for the first transmitting antenna and a second time area for the second transmitting antenna.

Next, when a time slot for a specific receiving apparatus 300 comes, the controller 110 senses the time slot (213), and determines a transmission mode (215). In this case, the controller 110 may check whether a current time slot is allocated corresponding to a first transmitting antenna or a second transmitting antenna to determine the transmission mode. Here, the transmission mode may be composed of a first transmission mode for the first transmitting antenna and a second transmission mode for the second transmitting antenna. For example, when the current time slot is allocated corresponding to the first transmitting antenna, the controller 110 may determine the first transmission mode. Further, when the current time slot is allocated corresponding to the second transmitting antenna, the controller 110 may determine the second transmission mode. Moreover, the controller 110 may check whether the current time slot is divided into a first time area and a second time area to determine the transmission mode. For example, when the current time slot is divided into the first time area and the second time area, the controller 110 may determine continuous execution of the first transmission mode and the second transmission mode.

Subsequently, the controller 110 executes a transmission mode through a current time slot (217). In this case, the controller 110 controls the first transmitting unit 120 and the second transmitting unit 130 to perform the transmission mode. Here, as shown in FIG. 10(*a*) or 10(*b*), the controller 110 may execute the first transmission mode or the second transmission mode. Furthermore, as shown in FIG. 10(*c*) or 10(*d*), the controller 110 may sequentially perform the first transmission mode and the second transmission mode according to the time. That is, the first transmitting unit 120 and the second transmitting unit 130 control respective transmission intensities of a signal and send the signal, respectively. At this time, in the first transmission mode, the first transmitting unit 120 sends a signal with reference power, and the second transmitting unit 130 sends a signal with power from zero to reference power. Here, the first transmitting unit 120 may send a signal, but the second transmitting unit 130 may not send the signal. Meanwhile, in the second transmission mode, the first transmitting unit 130 sends a signal with power from zero to reference power, and the second transmitting unit 130 sends the signal with the reference power. Here, the second transmitting unit 130 may send the signal, but the first transmitting unit 120 may not send the signal.

Figure 8:
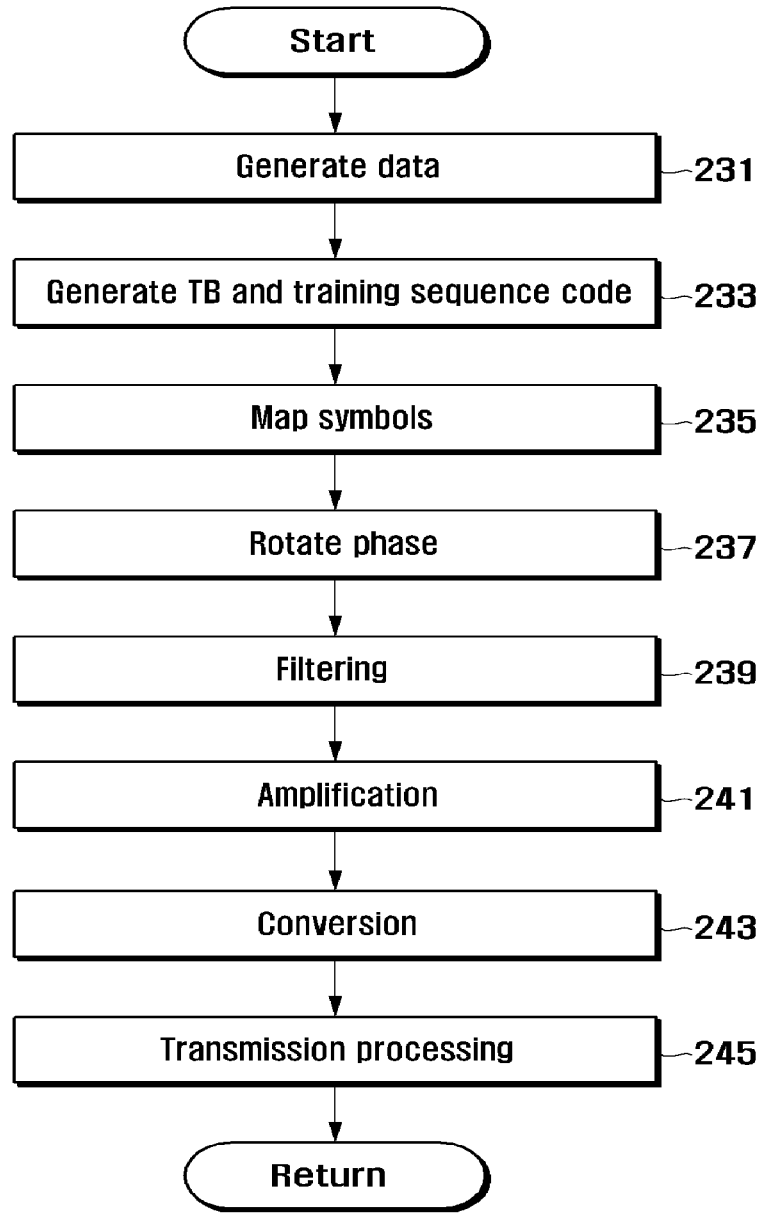
FIG. 8 is a flowchart illustrating a transmitting mode execution procedure shown in FIG. 7.

The following is a detailed operation of the first transmitting unit 120 or the second transmitting unit 130 upon execution of a transmission mode under the control of the controller 110. FIG. 8 is a flowchart illustrating a transmitting mode execution procedure shown in FIG. 7.

Referring to FIG. 8, upon execution of a transmission mode by the first transmitting unit 120 or the second transmitting unit 130 of this embodiment of the present invention, the data generator 141 generates data and a tail bit to be provided to a specific receiving apparatus 300 (231). Next, a TSC generator 143 generates a training sequence code to be provided to the specific receiving apparatus 300 (233). In this case, the TSC generator 143 determines to transmit a transmission intensity of a training sequence code with reference power or transmission power according to a current transmission mode. Subsequently, the mapper 147 receives and maps a tail bit, data, and a training sequence code through a switch 145 to symbols according to a burst structure corresponding to a current time slot (235).

At this time, as shown in FIG. 11, the mapper 147 may determine a location according to a transmission intensity of a training sequence code in a bit arrangement structure according to signal constellation. That is, when it is determined that the training sequence code is sent as the reference power, the mapper 147 may arrange the training sequence code at a periphery of the bit arrangement structure. For example, as shown in FIG. 11(*a*), the mapper 147 may arrange a training sequence code at positions of '1111' and '0011' in a bit arrangement structure according to signal constellation of a 16-Quadrature Amplitude Modulation (QAM) scheme. Further, as shown in FIG. 11(*b*), the mapper 147 may arrange a training sequence code at positions of '00000' and '10010' in a bit arrangement structure according to signal constellation of a 32-QAM scheme. Further, when it is determined that the training sequence code is sent with transmission power, the mapper 147 may arrange the training sequence code in an inside of a periphery in the bit arrangement structure. For example, the mapper 147 may arrange the training sequence code at positions of '1100' and '0000' in the bit arrangement structure according to signal constellation of a 16-QAM scheme. Furthermore, the mapper 147 may arrange the training sequence code at positions of '01001' and '11011' in the bit arrangement structure according to signal constellation of a 32-QAM scheme. In the meantime, according to a phase rotation effect by a multiplier 149 to be described below, the training sequence code may be arranged at other constellations positioned on a concentric circle.

Next, the multiplier 149 rotates a phase of a signal (237), and the filter 151 phases the signal to generate a signal of a burst structure (239). Subsequently, the amplifier 153 amplifies the signal (241). In this case, the amplifier 153 amplifies the training sequence code corresponding to the reference power.

Here, the amplifier 153 may reduce the reference power to transmission power under the control of the TSC gain controller 155. That is, when it is determined that the training sequence code is sent with the reference power, the TSC gain controller 155 provides a baseband gain as a set value such that the amplifier 153 amplifies the training sequence code corresponding to the reference power. Further, when it is determined that the training sequence code is sent with the transmission power, the TSC gain controller 155 provides a baseband gain of an approximate value of zero such that the amplifier 153 amplifies the training sequence code corresponding to the transmission power.

Next, the converter 157 converts an analog signal into a digital signal (243). Subsequently, after the transmission processor 159 sends a signal of a burst structure to a receiving apparatus 300 corresponding to a current time slot in a wireless scheme (245), it returns to FIG. 7.

That is, upon execution of the transmission mode, the first transmitting unit 120 or the second transmitting unit 130 may control transmission intensity of the training sequence code and transmit the training sequence code according to a location arranged in a bit arrangement structure according to signal constellation. Further, the first transmitting unit 120 or the second transmitting unit 130 may substantially control power to control a transmission intensity of a training sequence code and to transmit the training sequence code.

Finally, the controller 110 checks whether to terminate a transmission procedure for the specific receiving apparatus 300 (219). When it is determined to terminate the transmission procedure, the controller 110 terminates the transmission procedure. When it is not determined to terminate the transmission procedure, the controller 110 repeats steps 213 to 219.

Figure 12:
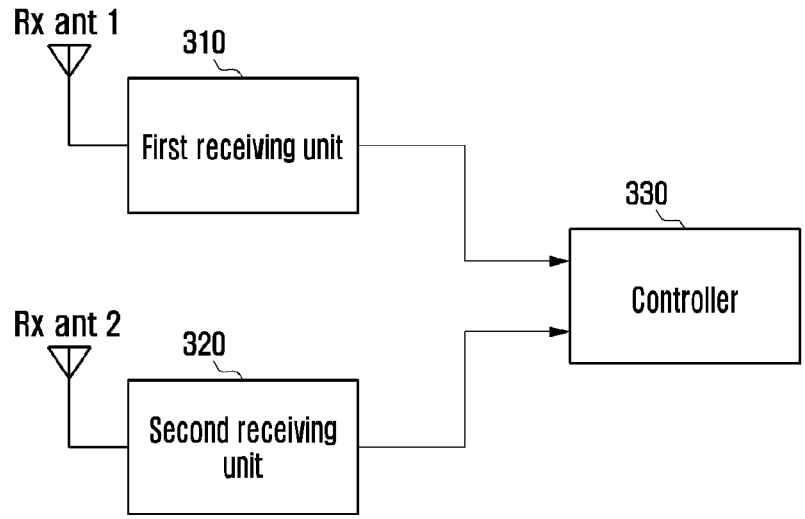
FIG. 12 is a block diagram illustrating a configuration of a receiving apparatus according to an exemplary embodiment of the present invention.

FIG. 12 is a block diagram illustrating a configuration of a receiving apparatus according to an exemplary embodiment of the present invention.

Referring to FIG. 12, the receiving apparatus 300 of this embodiment includes plural receiving antennas, namely, a first receiving antenna Rx ant 1 and a second receiving antenna Rx ant 2, and plural receiving units 310 and 320, namely, a first receiving unit 310 and a second receiving unit 320, and a controller 330. In this case, according to addition of various functions, the receiving apparatus 300 may include a plurality of additional structural elements, but a detailed explanation thereof is omitted.

The first receiving unit 310 and the second receiving unit 320 perform a signal receiving function of the receiving apparatus 300. The first receiving unit 310 and the second receiving unit 320 receive a signal according to a burst structure through at least one time slot in at least TDMA frame. In this case, in a specific time slot, the first receiving unit 310 and the second receiving unit 320 may receive at least one training sequence code, respectively. Further, in the specific time slot, the first receiving unit 310 and the second receiving unit 320 select a training sequence code to estimate a channel according to an embodiment of the present invention, respectively. Moreover, in the specific time slot, the first receiving unit 310 and the second receiving unit 320 select and store a training sequence by time areas, and combine training sequence codes of plural time slots to estimate a channel. The first receiving unit 310 and the second receiving unit 320 may select the training sequence code according to received power, respectively. Namely, when receiving a plurality of training sequence codes, the first receiving unit 310 and the second receiving unit 320 may select one of the training sequence codes having the greatest received power.

The controller 330 performs a function controlling an overall operation of the receiving apparatus 300. In this case, the controller 330 controls the first receiving unit 310 and the second receiving unit 320 to estimate channels, respectively. Furthermore, the controller 330 decodes respective channels for the first receiving unit 310 and the second receiving unit 320. Through this, the controller 300 may process and use data.

Figure 13:
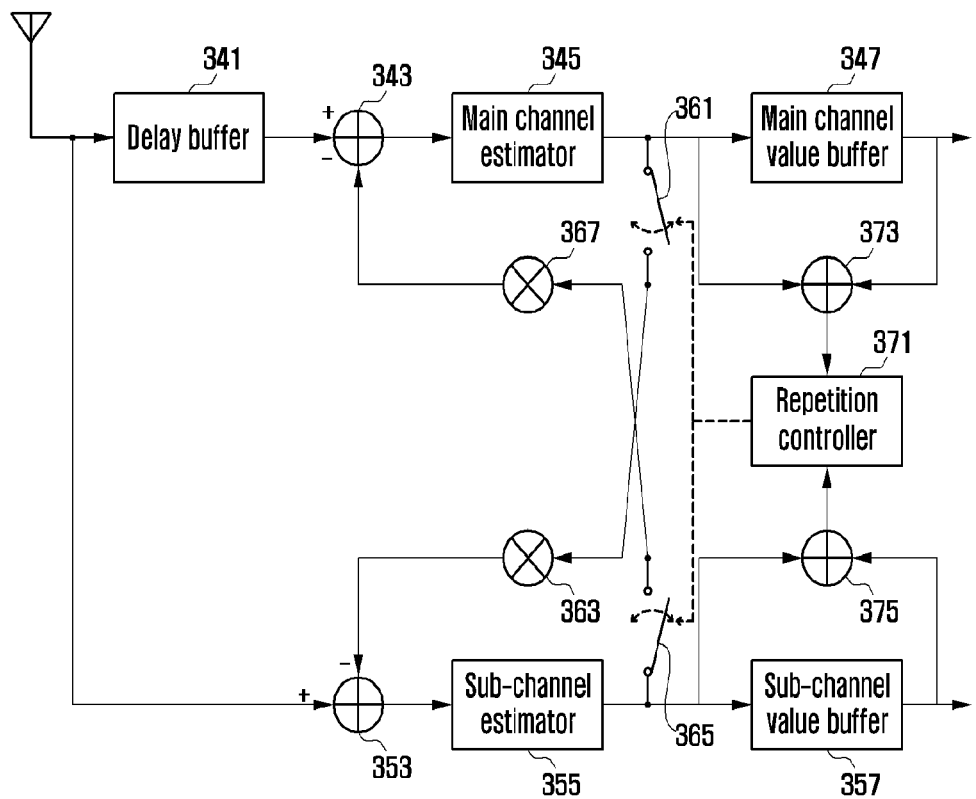
FIG. 13 is a block diagram illustrating a configuration of a receiving unit shown in FIG. 12.

FIG. 13 is a block diagram illustrating a configuration of a receiving unit shown in FIG. 12. In this case, it is assumed that the receiving unit is configured corresponding to one of plural receiving antennas in the receiving apparatus, and has the same internal construction corresponding to respective receiving antennas.

Referring to FIG. 13, each of receiving units 310 and 320 in this embodiment includes a delay buffer 341, a main channel adder 343, a main channel estimator 345, a main channel value buffer 347, a sub-channel adder 353, a sub-channel estimator 355, a sub-channel value buffer 357, a main channel value switch 361, a main channel value multiplier 363, a sub-channel value switch 365, a sub-channel value multiplier 367, a repetition controller 371, a main estimation value multiplier 373, and a sub-estimation value adder 375.

The delay buffer 341 separates training sequence codes received from a specific transmitting apparatus 100. That is, the delay buffer 341 separates training sequence codes by transmitting antennas of a transmitting apparatus 100. In this case, the delay buffer 341 select and determines one among the training sequence codes as a main signal, and determines remainders among the training sequence codes as a sub-signal. For example, upon receiving a signal like '$r_1$', the delay buffer 340 may separate it into a main signal like '$r_1[k]$' and a sub-signal like '$r_1[k+1]$'.

The main channel adder 343 regards and removes the sub-signal in the main signal as an interference signal. The main channel estimator 345 estimates a main channel based on the main signal to determine a main channel value. In this case, the main channel estimator 345 estimates the main channel according to an LS. For example, the main channel estimator 345 may estimate the main channel like '$h_{11}$' using '$r_1[k]$' to determine a main channel value like $\widehat{h}_{11}$, .

The channel value buffer 347 stores a main channel value. The sub-channel adder 353 regards and removes the sub-signal in the main signal as an interference signal. The sub-channel estimator 355 estimates a sub-channel based on the sub-signal to determine a sub-channel value. In this case, the sub-channel estimator 355 estimates a sub-channel according to an LS. For example, the sub-channel estimator 355 may estimate a sub-channel like '$h_{12}$' using '$r_1[k+1]$' to determine a sub-channel value like $\widehat{h}_{12}$, .

The sub-channel value buffer 357 stores a sub-channel value.

The main channel value switch 361 selectively transfers a sub-channel value to the main channel value adder 363. The main channel value adder 363 generates a main signal based on the main channel value and transfers the main signal to the sub-channel adder 353. For example, the main channel value multiplier 363 may combine a main convolution matrix like $\widehat{h}_{11}$, and '$\alpha A_1$' to generate a main signal. The sub-channel value switch 365 selectively transfers a sub-channel value to the sub-channel value multiplier 367. The sub-channel value multiplier 367 generates a sub-signal based on a sub-channel value and transfers the sub-signal to the main channel adder 343. For example, the sub-channel value multiplier 367 may combine a sub-convolution matrix like $\widehat{h}_{12}$, and '$\alpha A_2$' to generate a sub-signal.

The repetition controller 371 controls repeated estimation of a main channel or a sub-channel in a set maximum value. At this time, the repetition controller 371 controls repeated estimation of the main channel or a sub-channel according to stability of the main channel value or the sub-channel value. The main estimation value adder 373 determines the stability of the main channel value. That is, when the main channel value is repeatedly determined, the main estimation value adder 373 calculates a change value of the main channel value before or after storage in the main channel value buffer 347. The sub-estimation value adder 375 determines stability of a sub-channel value. Namely, when the sub-channel value is repeatedly determined, the sub-estimation value adder 375 calculates a change value of the sub-channel value before or after storage in the sub-channel value buffer 357.

Here, as the change value of the main channel value approximates zero, the repetition controller 371 determines that the stability of the main channel value is higher. That is why the interference signal is perfectly removed from the main signal. Further, when the stability of the main channel value is less than a threshold value, the repletion controller 371 again controls estimation of the main channel. As the change value of the sub-channel value approximates to zero, the repletion controller 371 determines that the stability of the sub-channel value is higher. That is why the interference signal is perfectly removed from the sub-signal. Further, when the stability of the sub-channel value is less than a threshold value, the repletion controller 371 again controls estimation of the sub-channel. Meanwhile, the stability of the main channel value is equal to or greater than the threshold value or the repetition estimation number of the main channel becomes a maximum value, the repletion controller 371 stops repletion estimation of the main channel. In the meantime, when the stability of the sub-channel value is equal to or greater than the threshold value or the repetition estimation number of the sub-channel becomes a maximum value, the repletion controller 371 stops repletion estimation of the sub-channel.

Figure 14:
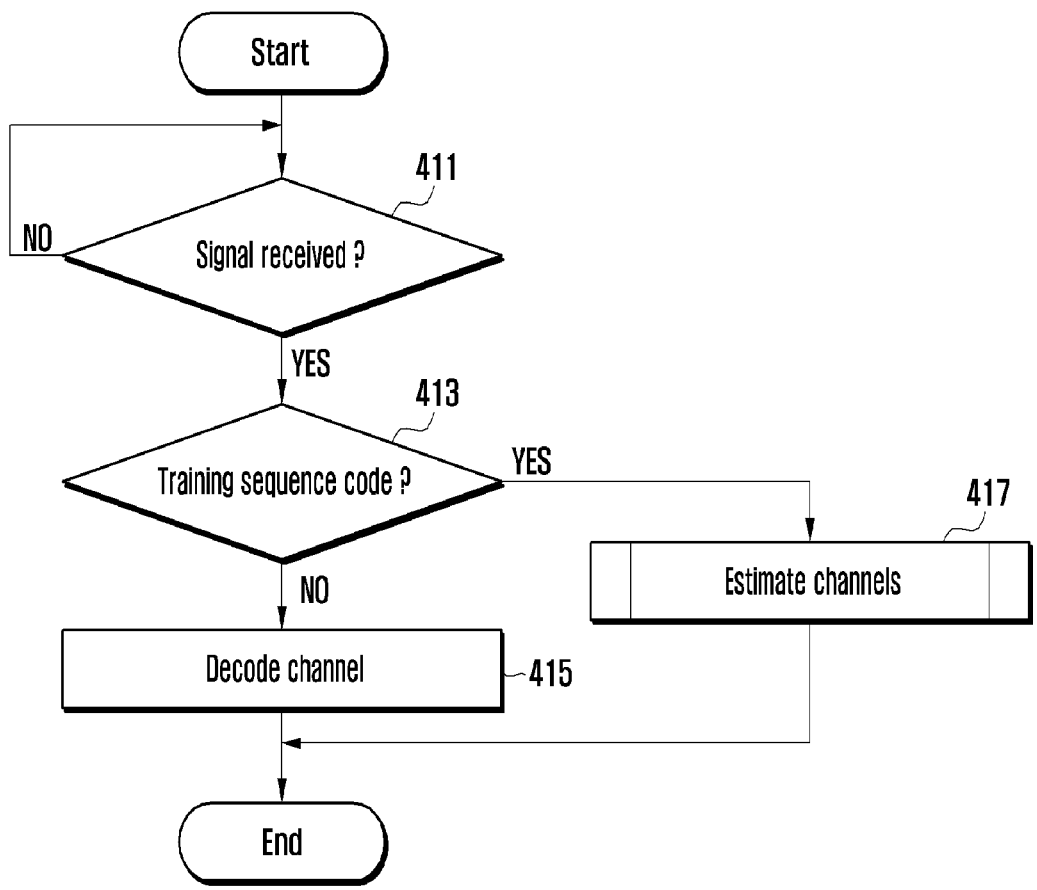
FIG. 14 is a flowchart illustrating a receiving method cording to an exemplary embodiment of the present invention.

FIG. 14 is a flowchart illustrating a receiving method cording to an exemplary embodiment of the present invention.

Referring to FIG. 14, in the receiving method of this embodiment, when a signal is received through a first receiving unit 310 and a second third receiving unit 320, a controller 330 senses it (411). Next, the controller 330 checks whether or not the received signal is a training sequence code (413). In this case, when the received signal is not the training sequence code, the controller 330 decodes a channel using a determined channel value to restore data (415). Conversely, when the received signal is the training sequence code, the controller 330 controls the first receiving unit 310 and the second receiving unit 320 to estimate channels for the first receiving unit 310 and the second receiving unit 320 as the received signal (417). At this time, the controller 330 may select the training sequence code according to reception power to estimate a corresponding channel.

Figure 15:
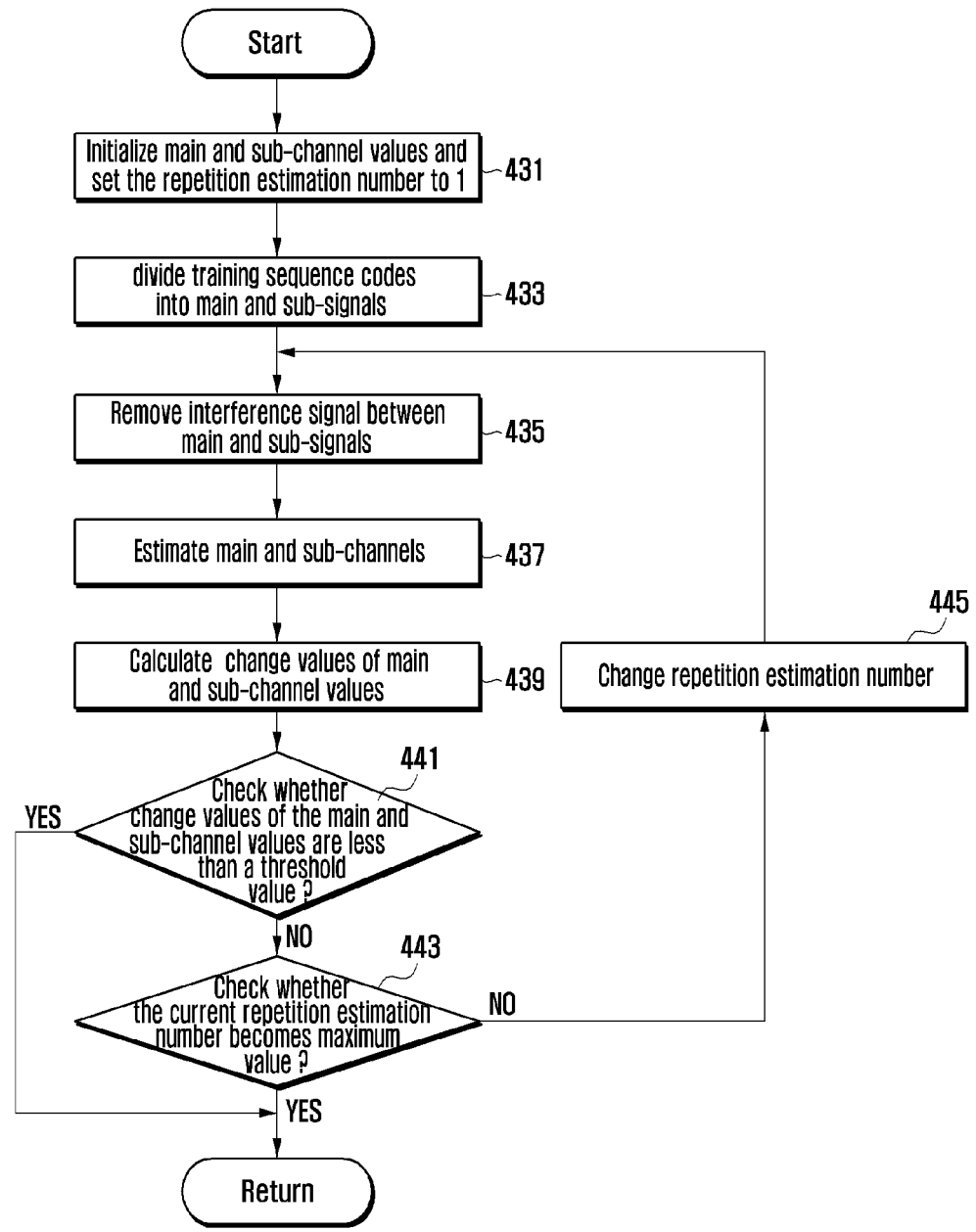
FIG. 15 is a flowchart illustrating a channel estimation procedure shown in FIG. 14.

As described above, the following is a detailed description of a first receiving unit 310 or a second receiving unit 320 for estimating a channel under the control of the controller 330. FIG. 15 is a flowchart illustrating a channel estimation procedure shown in FIG. 14.

Referring to FIG. 15, when the first receiving unit 310 or the second receiving unit 320 of this embodiment receive training sequence codes, a repletion controller 371 initializes a main channel value of a main channel value buffer 347 and a sub-channel value of a sub-channel value buffer 357 (431). Further, the repletion sets the repletion estimation number to 1. Next, a delay buffer 341 divides the training sequence codes into a main signal and a sub-signal (433). That is, the delay buffer 341 divides the training sequence codes by transmitting antennas of a transmitting apparatus 100. In this case, the delay buffer 341 selects and determines one of the training sequence codes as a main signal and one of the training sequence codes as a sub-signal.

Subsequently, a main channel adder 343 and a sub-channel adder 353 remove an interference signal between the main signal and the sub-signal (435). Namely, the main channel adder 343 regards the sub-channel in the main signal as an interference signal and removes it, and the sub-channel adder 353 regards the main channel in the sub-signal as an interference signal and removes it. Subsequently, a main channel estimator 345 and a sub-channel estimator 355 estimate a main channel as the main signal and a sub-channel as the sub-signal, respectively (437). That is, the main channel estimator 345 estimates the main channel to determine a main channel value, and the sub-channel estimator 355 estimates the sub-channel to determine a sub-channel value. In this case, the main channel estimator 345 may store the main channel value in a main channel value buffer 347, and the sub-channel estimator 355 may store the sub-channel value in a sub-channel value buffer 357.

In this case, a main channel value switch 361 selectively transfers the sub-channel value to a main channel value multiplier 363, and the main channel value multiplier 363 generates and transfers the main signal based on the main channel value to a sub-channel multiplier 353. Through this, the sub-channel multiplier 353 regards the main signal in the sub-signal to remove it. Further, a sub-channel value switch 365 selectively transfers the sub-channel value to a sub-channel value multiplier 367, and a sub-channel value multiplier 367 generates a sub-signal and transfers as the sub-channel value to the sub-channel adder 343. Through this, the main channel adder 343 regards the sub-signal in the main signal to remove it.

Next, a main estimation value adder 373 and a sub-estimation value adder 375 calculate a change value of the main channel value and a change value of the sub-channel value, respectively (439). That is, the main estimation value adder 373 calculates change values of the main channel value before and after repetition, and the sub-estimation value adder 375 calculates change values of the sub-channel value before and after repetition. Further, the repetition controller 371 checks whether the change values of the main channel value and the sub-channel value are less than a threshold value (441). That is, the repetition controller 371 determines the stabilities of the main channel value and the sub-channel value as the change values of the main channel value and the sub-channel value. When both of the change value of the main channel value and the change value of the sub-channel value are less than the threshold value, the repetition controller 371 returns to FIG. 14. That is, the repetition controller 371 determines that the stabilities of the main channel value and the sub-channel value are high and stops repeated estimation of the main channel value and the sub-channel value.

In the meantime, when both of the change value of the main channel value and the change value of the sub-channel value are equal to or greater than the threshold value, the repetition controller 371 checks whether the current repetition estimation number becomes a maximum value (443). When the current repetition estimation number becomes the maximum value, the repetition controller 371 returns to FIG. 14. That is, the repetition controller 371 stops repetition estimations of the main channel value and the sub-channel value.

Conversely, when the current repetition estimation number does become the maximum value, the repetition controller 371 changes the repetition estimation number (445), and then repeats steps 435 to 445. That is, when the current repetition estimation number is less than the maximum value, the repetition controller 371 increases the repetition estimation number by 1, and repeatedly estimates the main channel value and the sub-channel value.

Namely, when receiving the training sequence codes through the first receiving unit 310 and the second receiving unit 320, the controller 330 may restore and use data using a channel corresponding to one among the training sequence codes having the greatest reception power in the first receiving unit 310 and the second receiving unit 320.

Therefore, in the method and apparatus for transmitting and receiving a training sequence code according to the present invention, a transmitting apparatus sends a training sequence code with different transmission intensities by transmitting antennas through a specific time slot such that a receiving apparatus may suppress mutual interference between training sequence codes. Due to this, the present invention may improve a channel estimation performance in the communication system.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The invention claimed is:

1. A method for transmitting a training sequence code of a transmitting apparatus with a plurality of transmitting antennas in a communication system, the method comprising:
   allocating a plurality of time slots in at least one frame to one of the plurality of transmitting antennas; and
   transmitting a training sequence code having first transmission power for one antenna of the transmitting antennas, and the remaining training sequence codes having second transmission power for the remainder of the transmitting antennas in any one of the time slots, for reducing interference between the training sequence codes transmitted by respective transmitting antennas,
   wherein the second transmission power is smaller than the first transmission power, and
   wherein transmitting the training sequence code and the remaining training sequence codes comprises:
   sending the training sequence code through bits arranged at a periphery in a bit arrangement structure according to signal constellation, and sending the remaining training sequence codes through bits arranged at an inside of the periphery in the bit arrangement structure.

2. The method of claim 1, wherein the respective time slots are spread over a plurality of frames or a plurality of frequency bands.

3. The method of claim 1, further comprising dividing the respective time slots into a plurality of time areas for the respective transmitting antennas to correspond the time areas to the respective transmitting antennas,
   wherein transmitting the training sequence code or the remaining training sequence codes comprises sending the training sequence code for one transmitting antenna corresponding to the one time area in one of the time areas with the reference power, and the remaining training sequence codes with the transmission power.

4. A method for receiving a training sequence code of a receiving apparatus with a plurality of receiving antennas in a communication system, the method comprising:

receiving a plurality of training sequence codes for a plurality of transmitting antennas through any one of the plurality of receiving antennas from a transmitting apparatus; and selecting one of the training sequence codes having the greatest reception power to estimate a channel, wherein a training sequence code, among the plurality of training sequence codes, having first transmission power is transmitted through one antenna of the transmitting antennas, and the remaining training sequence codes having second transmission power is transmitted through the remainder of the transmitting antennas in any one of the time slots, for reducing interference between the training sequence codes transmitted by respective transmitting antennas, wherein the second transmission power is smaller than the first transmission power, and wherein transmitting the training sequence code and the remaining training sequence codes comprises sending the training sequence code through bits arranged at a periphery in a bit arrangement structure according to signal constellation, and sending the remainders of the training sequence codes through bits arranged at an inside of the periphery in the bit arrangement structure.

5. The method of claim 4, wherein the time slots are spread over a plurality of frames or a plurality of frequency bands.

6. The method of claim 4, wherein the time slots are divided into a plurality of time areas for the respective time areas corresponding to the respective transmitting antennas, and receiving a plurality of training sequence codes comprises receiving and storing the training sequence codes by the time slots in the respective time slots.

7. A transmitting apparatus with a plurality of transmitting antennas in a communication system, the apparatus comprising:

a controller allocating a plurality of time slots in at least one frame to one of a plurality of transmitting antennas; and a plurality of transmitting units configured corresponding to the respective transmitting antennas, and each of the transmitting units including a generator generating a training sequence code, and a transmission processor processing and transmitting the training sequence code through the transmitting antenna, wherein the transmitting unit transmits a training sequence code having first transmission power for one antenna of the transmitting antennas, and transmits the remaining training sequence codes having second transmission power for the remainders of the transmitting antennas having in any one of the time slots, for reducing interference between the training sequence codes transmitted by respective transmitting antennas, wherein the second power is smaller than the first transmission power, and wherein the transmitting unit further comprises a mapper mapping the training sequence code to bits arranged at a periphery in a bit arrangement structure according to signal constellation when any one of the time slots is allocated to one transmitting antenna corresponding to the transmitting unit, and mapping the training sequence code to bits arranged at an inside of the periphery in the bit arrangement structure when the any one of the time slots is not allocated to the any one transmitting antenna.

8. The transmitting apparatus of claim 7, wherein the transmitting unit further comprises a gain controller reducing the transmission power to zero.

9. The transmitting apparatus of claim 7, wherein the controller allocates the respective time slots to be spread over a plurality of frames or to be spread over a plurality of frequency bands.

10. The transmitting apparatus of claim 7, wherein the controller divides the respective time slots into a plurality of time areas for the respective transmitting antennas to correspond the time areas to the respective transmitting antennas, and the transmitting unit sends the training sequence code with the reference power when any one of the time areas corresponds to the transmitting unit, and sends the training sequence codes with the transmission power when the any one of the time areas does not correspond to the transmitting unit.

11. A receiving apparatus with a plurality of receiving antennas in a communication system, the apparatus comprising:

receiving units configured corresponding to a plurality of receiving antennas for receiving a plurality of training sequence codes for a plurality of transmitting antennas from a transmitting apparatus; and a controller for selecting and estimating one of the training sequence codes with the greatest reception power upon reception of the training sequence codes through one of the receiving antennas, wherein a training sequence code, among the plurality of training sequence codes, having first transmission power is transmitted through one antenna of the transmitting antennas, and the remaining training sequence codes having second transmission power is transmitted through the remainder of the transmitting antennas in any one of the time slots, for reducing interference between the training sequence codes transmitted by respective transmitting antennas, wherein the second transmission power is smaller than the first transmission power, and wherein transmitting the training sequence code and the remaining training sequence codes comprises sending the training sequence code through bits arranged at a periphery in a bit arrangement structure according to signal constellation, and sending the remainders of the training sequence codes through bits arranged at an inside of the periphery in the bit arrangement structure.

12. The receiving apparatus of claim 11, wherein the time slots are spread over a plurality of frames or a plurality of frequency bands.

13. The receiving apparatus of claim 11, wherein the time slots are divided into a plurality of time areas for the respective transmitting antennas corresponding to the respective transmitting antennas, and the receiving units receive and store the training sequence codes by the time slots in the respective time slots.

* * * * *